Oct. 16, 1956     K. H. WHITE     2,766,766

PRESSURE CONTROLLED VALVE

Filed Nov. 1, 1954

INVENTOR
KENNETH H. WHITE
BY
HIS ATTORNEY

United States Patent Office 2,766,766
Patented Oct. 16, 1956

2,766,766

PRESSURE CONTROLLED VALVE

Kenneth H. White, Corning, N. Y., assignor to Ingersoll-Rand Company, New York, N. Y., a corporation of New Jersey Application November 1, 1954, Serial No. 465,873

3 Claims. (Cl. 137—102)

This invention relates to pressure controlled valves, and more particularly to a valve that is automatically actuated to one of its controlling positions by a predetermined maximum pressure of the fluid which it controls and to another controlling position upon decrease to a predetermined maximum value of the pressure of such fluid.

The valve is of the type forming the subject matter of United States Patent No. 1,806,301, Le Valley, and an object is to assure a quick and positive shifting of the valve to its controlling positions.

A more specific object is to prevent the wastage of pressure fluid during the shifting of the valve from one controlling position to another.

Other objects will be in part obvious and in part pointed out hereinafter.

Figure 1:
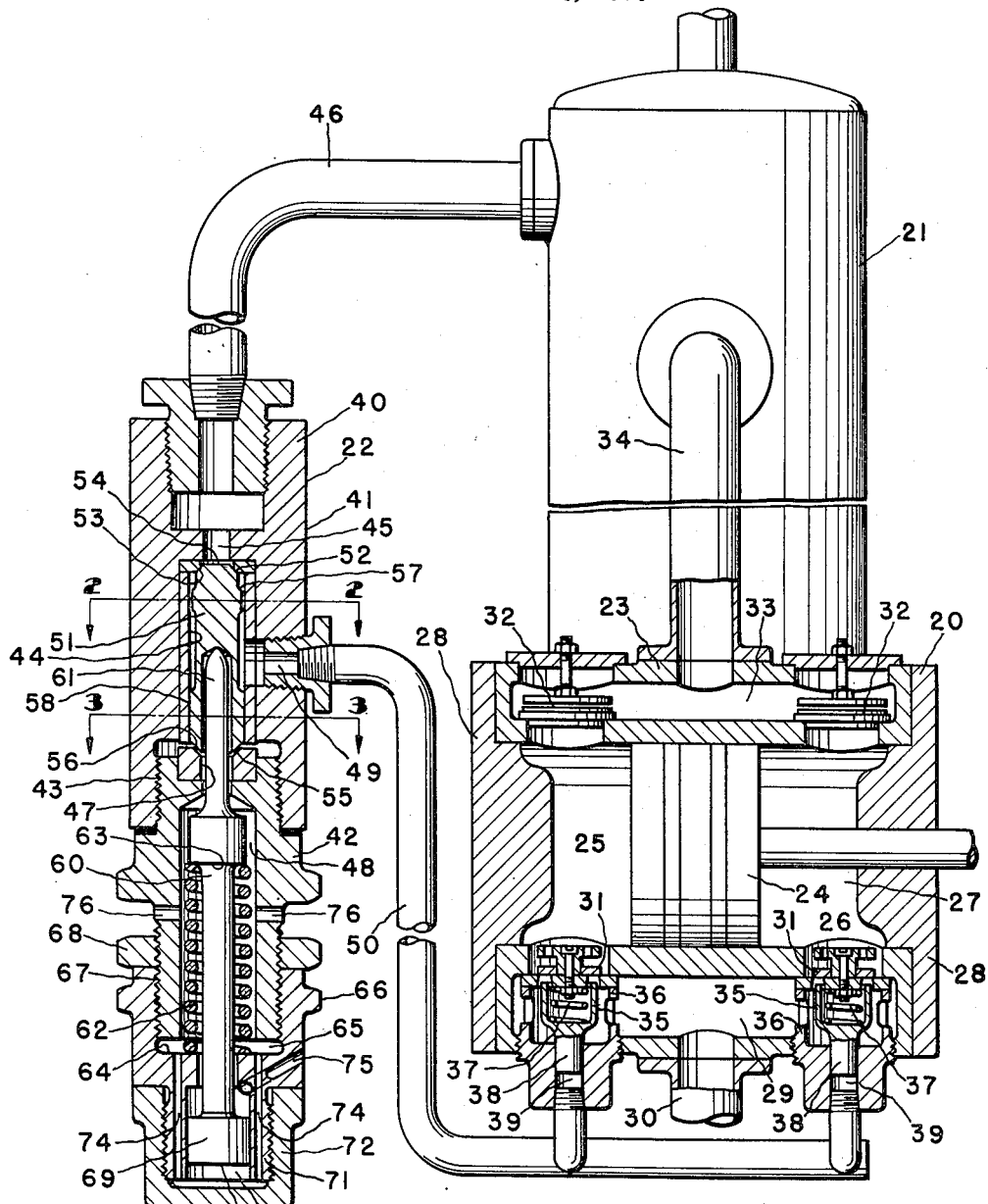
Figure 2:
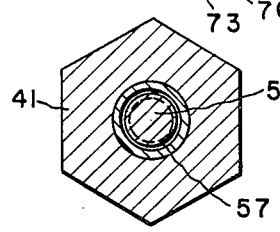
Figure 3:
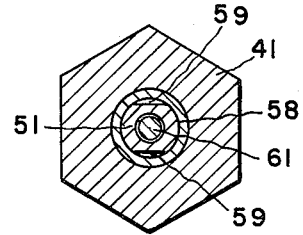

In the drawings accompanying this specification and in which similar reference numerals refer to similar parts, Figure 1 is an elevation, partly broken away, of a compressor unit equipped with a valve constructed in accordance with the practice of the invention, and Figs. 2 and 3 are transverse views taken through Figure 1 on the lines 2—2 and 3—3, respectively.

Referring more particularly to the drawings, 20 designates a compressor, 21 a storage receiver for the compressor and 22 a valve for controlling the load of the compressor 20.

The compressor 20 is shown as being of the double acting type having a cylinder 23 and a reciprocatory piston 24 therein to compress fluid in the opposed end portions 25 and 26 of the compression chamber 27. The end portions 25 and 26 are closed by heads 28 which may be secured to the ends of the cylinder 23 in any well known manner.

The fluid medium intended to be compressed enters an inlet chamber 29 in the cylinder through a supply conduit 30 and its flow into the compression chamber 27 is controlled by inlet valves 31 which are actuated automatically by pressure differential. The discharge of fluid from the compression chamber is controlled by valves 32 which also operate automatically to control the flow of fluid into a discharge chamber 33, in the cylinder 23, and such fluid is conveyed from the discharge chamber to the storage receiver 21 by a conduit 34.

The loading and unloading of the compressor is effected, in a well known manner, by spiders 35 in cages 36 that hold the inlet valve mechanisms in the correct assembled positions in the cylinder. The spiders 35 are held out of engagement with the inlet valves 31 during the normal operation of the compressor by springs 37. They carry fluid actuated pistons 38 which are reciprocable in chambers 39 in the cages 36 and are actuated by pressure fluid to press the spider against the inlet valves for holding said valves in position to unload the compressor.

The flow of pressure fluid to and from the piston chambers 39 is controlled by the pressure controlled valve 22 which, constructed in accordance with the practice of the invention, comprises a casing 40 consisting of a pair of members 41 and 42 that are threadedly connected together as at 43. Within the member 41 is a valve chamber 44 having a port 45 at one end that opens into a conduit 46 leading to the receiver 21, and at the opposite end of the valve chamber 44 is an exhaust port 47 that opens into a bore 48 in the member 42. A passage 49 in the casing 40 affords communication between the intermediate portion of the valve chamber 44 and a conduit 50 leading to the chambers 39.

Communication of the ports 45 and 47 with the passage 49 is controlled by a valve 51. The valve 51 is reciprocable in the valve chamber 44 and has a beveled seating surface 52 at the end adjacent the port 45 to cooperate with a similarly shaped seating surface 53 on the casing 40, and the end of the valve 51 encircled by the seating surface 52 constitutes an actuating surface 54 that is subjected to the pressure of the fluid in the port 45 for unseating the valve. The opposite end of the valve also has a beveled surface 55 for cooperation with a seating surface 56, on the casing member 42, encircling the port 47.

The portion of the valve 51 lying between the port 45 and the passage 49 carries an external flange 57 which is of slightly smaller diameter than the valve chamber 44 to permit the flow of pressure fluid thereacross to the passage 49 whenever the valve 51 occupies a position to uncover the port 45. The peripheral portion 58 of the valve lying between the passage 49 and the port 47 serves to guide the valve in the valve chamber and is flatted on diametrically opposite sides thereof to provide spaces 59 that afford communication between the passage 49 and the port 47 when the adjacent end of the valve is unseated.

The valve 51 is normally held against the seating surface 53, to cover the port 45, by a plunger 60 in the bore 48 having an extension 61 that extends through the port 47 and into the valve against which it is pressed by a spring 62. The spring 62 encircles the plunger 60 and seats at one end against a shoulder 63 on the plunger and at its other end against the bottom 64 of a recess 65 in a body 66 at the lower end of the casing member 41. The body 66 is threaded onto the lower end of the casing member 42 as at 67 and is adjustable thereon to selectively vary the force of the spring 62 for action in response to desired maximum and minimum receiver pressures at which the valve 51 is intended to act for unloading and loading the compressor. A nut 68 serves to lock the body 66 firmly to the casing member 42.

Means are provided to utilize the pressure of the fluid admitted into the bore 48 through the port 47 as a force to assist in effecting a speedy and positive shifting of the valve from the seating surface 56 to the seating surface 53. To this end the plunger 60 includes an enlarged head, or piston, 69 at its lower extremity for reciprocation within a chamber 70 in the adjacent portion 71 of the body 66. The portion 71 is of smaller diameter than the body 66 and is threaded exteriorly for the accommodation of a cap nut 72 which forms a closure for the chamber 70.

The piston 69 is made as a separate element of the plunger 60 in order to permit assembly of the plunger 60 in its operative position as shown. The lower end of the piston 69 constitutes a pressure surface 73 and pressure fluid is conveyed into the chamber 70 to act thereagainst by a group of passages 74, only two being shown, in the body 66 and communicating with the bore 48. The inner end of the chamber 70 is vented to the atmosphere by a passage 75 in the body 66, and in the casing member 42 are atmospheric exhaust ports 76 for the bore 48.

In the operation of the device and with the pressure in the receiver 21 below the preedtermined maximum value at which it is intended to unload the compressor, the spiders 35 are held in retracted positions by the springs 37 to permit freedom of movement of the inlet valves 31.

Under these conditions of operation the valve 51 is seated upon the surface 53 to close the port 45. The valve is held thus by the force of the spring 62 and the inlet valves 31 will then operate automatically to admit fluid medium into the compression chamber 27 until the pressure within the storage receiver reaches the desired predetermined maximum value. When this pressure is attained the fluid acting against the surface 54 will overcome the force of the spring 62 and move the valve 51 toward the seating surface 56.

Immediately following the unseating of the valve pressure fluid will flow into the valve chamber against the flange 57 and accelerate the movement of the valve to close the discharge port 47. In the new position of the valve 51 pressure fluid will flow across the peripheral surface of the flange 57 to the passage 49, thence through the conduit 50 into the chambers 39 against the pistons 38 and depress the spiders 35 to hold the inlet valves 31 away from their seats, thereby unloading the compressor.

The parts will remain in the positions described until the pressure within the receiver 21 falls to a predetermined minimum value whereupon the spring 62 will move the valve 51 toward the seat 53 for closing the port 45 and to uncover the port 47. Pressure fluid will then flow from the chambers 39 and the associated channels into the valve chamber 44, thence through the spaces 59, the port 47, the bore 48 and through the passages 74 into the chamber 70 against the actuating surface 73 of the piston 69 and impart a sharp thrust to the plunger to assist the spring 62 in moving the valve against the seating surface 53. This force, added to that of the spring 62, causes the valve to shift quickly and has the effect of materially minimizing the loss of pressure fluid directly from the storage receiver into the bore 48 during the shifting of the valve.

It is understood, of course, that some of the fluid thus discharged into the bore 48 passes immediately to the atmosphere through the exhaust ports 76, but the volume of fluid flowing into the bore 48 is sufficiently large to assure the impartation of a strong thrust to the plunger 60 before its pressure is materially reduced by discharge through the ports 76.

Upon exhaust of the fluid from the chambers 39 the springs 37 will again act to remove the spiders 35 out of engagement with the inlet valves 31 for reloading the compressor.

I claim:

1. A pressure controlled valve, comprising a casing having a valve chamber and a bore, an inlet port at one end of the valve chamber, a discharge port at the other end of the valve chamber opening into the bore, a passage in the casing opening into the intermediate portion of the valve chamber, a reciprocatory valve in the valve chamber to control the ports and having an actuating surface subjected to pressure fluid in the inlet port for moving the valve to close the discharge port and valve pressure fluid from the inlet port to the passage, a spring for moving the valve to close the inlet port and uncover the discharge port to permit the flow of pressure from the passage into the bore, and means acting against the valve actuated by pressure fluid thus discharged into the bore to accelerate the motion of the valve in the direction of closing the inlet port.

2. A pressure controlled valve, comprising a casing having a valve chamber and a bore, an inlet port at one end of the valve chamber, a discharge port at the other end of the valve chamber opening into the bore, a passage in the casing opening into the intermediate portion of the valve chamber, a reciprocatory valve in the valve chamber to control the ports and having an actuating surface subjected to pressure fluid in the inlet port for shifting the valve to close the discharge port and valve pressure fluid from the inlet port to the passage, a spring for shifting the valve to close the inlet port and to uncover the discharge port to permit the discharge of fluid from the passage into the bore, and a piston in the casing subjected to the pressure of the fluid thus discharged into the bore acting against the valve to assist the spring in the shifting the valve to close the inlet port rapidly.

3. A pressure controlled valve, comprising a casing having a valve chamber and a bore therein, an inlet port at one end of the valve chamber, a discharge port at the other end of the valve chamber to afford communication between the valve chamber and the bore, a passage in the casing opening into the valve chamber, a reciprocatory valve in the valve chamber to control the ports and being shifted by pressure fluid in the inlet port to valve pressure fluid to the passage and to close the discharge port, a plunger in the bore seating against the valve, a spring acting against the plunger for moving the valve to close the inlet port and to uncover the discharge port to permit the discharge of pressure fluid from the passage into the bore, and an actuating surface on the plunger subjected to the pressure fluid thus discharged into the bore to assist the spring in moving the valve to close the inlet port rapidly.

References Cited in the file of this patent

UNITED STATES PATENTS

| | | |
|---|---|---|
| 1,806,301 | Le Valley | May 19, 1931 |
| 2,391,790 | Martinsson | Dec. 25, 1945 |
| 2,437,480 | Pugh et al. | Mar. 9, 1948 |